United States Patent [19]

Hale et al.

[11] Patent Number: 5,007,703

[45] Date of Patent: Apr. 16, 1991

[54] METHOD OF MAKING OPTICAL FIBRE CABLES

[75] Inventors: Peter G. Hale, London; John N. Russell, Ringwood, both of United Kingdom

[73] Assignee: STC plc, London, England

[21] Appl. No.: 454,184

[22] Filed: Dec. 21, 1989

[30] Foreign Application Priority Data

Dec. 22, 1988 [GB] United Kingdom ............... 8829871

[51] Int. Cl.$^5$ .................... G02B 6/44; H02G 15/00; B21D 39/00
[52] U.S. Cl. ................... 350/96.23; 350/320; 156/166; 523/173; 228/148
[58] Field of Search ............ 350/96.10, 96.23, 320; 523/173; 156/54, 55, 166; 174/70 R, 25 C, 110 SR; 228/134, 148, 165, 15.1, 17.5

[56] References Cited

U.S. PATENT DOCUMENTS

| 4,156,104 | 5/1979 | Mondello | 350/96.23 X |
|---|---|---|---|
| 4,158,478 | 6/1979 | D'Auria et al. | 350/96.23 |
| 4,239,336 | 12/1980 | Parfree et al. | 350/96.23 X |
| 4,257,675 | 3/1981 | Nakagome et al. | 350/96.23 |
| 4,288,144 | 9/1981 | Nakai et al. | 350/96.23 |
| 4,372,792 | 2/1983 | Dey et al. | 350/96.23 X |
| 4,432,605 | 2/1984 | Niiro et al. | 350/96.23 |
| 4,555,054 | 11/1985 | Winter et al. | 350/96.23 X |
| 4,596,743 | 6/1986 | Brauer et al. | 174/25 C X |
| 4,705,571 | 11/1987 | Lange et al. | 106/287.1 |
| 4,938,560 | 7/1990 | Arroyo et al. | 350/96.23 |
| 4,946,237 | 8/1990 | Arroya et al. | 350/96.23 |
| 4,956,039 | 9/1990 | Olesen et al. | 350/96.23 X |
| 4,959,345 | 9/1990 | Sakuma et al. | 350/96.23 |

FOREIGN PATENT DOCUMENTS

| 2118735 | 11/1983 | United Kingdom | 350/96.23 X |
|---|---|---|---|
| 2152235 | 7/1985 | United Kingdom | 350/96.23 X |
| 2206976 | 1/1989 | United Kingdom | 350/96.23 X |

*Primary Examiner*—Brian Healy
*Attorney, Agent, or Firm*—Lee, Mann, Smith, McWilliams & Sweeney

[57] ABSTRACT

A one-shot method of making an optical fiber package (FIG. 1) for a submarine cable. A plurality of fibers (1) are fed into a space delimited by one or more elongate elements from which a tubular structure (3) can be formed, for example a C-section. A liquid filling material, such as a two-part exothermic curing polyurethne, mixed by static mixer (16), is injected into the C-section which is then closed by a die (17). The filling material rapidly cures to a resilient solid (2) in which the fibers are embedded before hauler (18) is reached. The fibers are spaced apart from one another and the tubular structure by means including a guide structure (14,15) as they enter the C-section and this is maintained in the cured material.

10 Claims, 1 Drawing Sheet

METHOD OF MAKING OPTICAL FIBRE CABLES

BACKGROUND OF THE INVENTION

This invention relates to optical fibre cables and in particular optical fibre packages for use in submarine cables and methods of manufacturing them.

In a cable core of one submarine cable design the optical fibres are housed within a pressure tube formed, for example, from a copper C-section The optical fibres are embedded together with a strength member wire in extruded plastics material and together form an optical fibre package. The residual volume between the pressure tube and the optical fibre package is filled with a water blocking compound such as HYVIS 2000 (HYVIS is a registered Trade Mark). One process for producing such a cable core involves a number of discrete process steps, namely: procuring a HYTREL 40D, (HYTREL is a Registered Trade Mark) coated copper clad steel King wire (strength member wire); concurrent melting of the HYTREL coating, positioning optical fibres around the King wire, and over-extrusion with HYTREL; insertion of the thus produced package together with HYVIS 2000 into a C-section, followed by C-section closure; cladding with copper tape and providing a longitudinal sealing weld.

An object of the present invention is to provide an alternative method of producing a submarine cable core.

SUMMARY OF THE INVENTION

According to one aspect of the present invention there is provided a method of manufacturing a core for an optical fibre submarine cable comprising the steps of feeding a plurality of optical fibres in a spaced-apart relationship into a spaced delimited by one or more elongate elements from which a tubular structure can be formed, injecting a liquid filling material into the space, forming said tubular structure and permitting or causing the liquid filling material to be converted to a solid material in which the fibres are embedded at respective positions spaced-apart from one another and the tubular structure.

According to another aspect of the present invention there is provided an optical fibre package comprising the steps of:
moving a C-sectioned elongate member in a first general direction past a first point;
feeding at least one optical fibre into the interior of the elongate member at the first point;
injecting a liquid filling material into the interior of the elongate member to surround the or each fibre;
causing the cross-section of the elongate member to become substantially circular, and
permitting or causing the liquid filling material to be converted to a solid material in which the or each fibre is embedded in a respective predetermined position spaced-apart from one another and the elongate member.

According to a further aspect of the present invention there is provided a method of manufacturing a core for an Optical fibre submarine cable cOmprising the steps of feeding a plurality of optical fibres in a spaced-apart relationship into an open C-section, injecting the liquid two-part exothermic curing polyurethane filling material into the C-section, closing the C-section and permitting or causing curing of said filling material as a result of which the fibres become embedded in cured filling material at respective positions spaced-apart from one another and the closed C-section.

According to another aspect of the present invention there is provided a method of manufacturing a core for an optical fibre submarine system cable comprising the steps of feeding the plurality of optical fibres in a spaced-apart relationship into a space delimited by one or more elongate elements from which a tubular structure can be formed, injecting a liquid two-part exothermic curing polyurethane filling material into the space, forming said tubular structure and permitting or causing curing of said filling material as a result of which the fibres become embedded in cured filling material at respective positions spaced-apart from one another and the tubular structure.

According to still another aspect of the present invention there is provided an optical fibre package comprising of pressure tube and one or more optical fibres embedded in a resilient cured material and spaced-apart from one another and the pressure tube, the resilient cured material filling the pressure tube.

BRIEF DESCRIPTION OF THE DRAWINGS

Embodiments of the invention will now be described with reference to the accompanying drawings, in which.

DESCRIPTION OF THE PREFERRED EMBODIMENTS

The conventional submarine cable core manufactured by the aforementioned multi-step process is relatively expensive. If the multi-step process could be replaced by a single stage process, a considerable cost saving could be realisable if similarly priced materials were used. Furthermore, yield is likely to improve if the number of processes is reduced.

One problem with the conventional core is that while the HYVIS blocking compound provides an effective longitudinal water barrier, it does allow limited relative movement between the HYTREL covered package and C-section. This results in jointing problems. This effect is considered likely to be exacerbated during and after cable deployment, and during lifting and repair operations.

A further problem with the conventional cable core is the difficulty of separating and stripping the fibres from the HYTREL. The use of a material which can be more easily removed would save considerable time during jointing and repair.

Preferably a replacement process for the conventional process should reduce the number of steps to a single one-shot process and involve direct insertion of the fibres into the C-section. It is, however, essential to use an insertion process which can be stopped and restarted at will, for example, for changeover of a C-section feedstock. For practical production times, operation at a line speed of the order of 30 metres per minute is desirable. The replacement process should produce cable core with acceptable longitudinal water blocking characteristics. The fibres, filling material and closed C-section should be locked together to avoid excessive fibres strains during tensile loading of a complete cable. This necessitates the use of a filling material with non-negligible shear modulus, high breaking strain and good adhesion to primary coated fibres. The fibres should be in defined positions within the closed C-section and out of contact with the latter. The process to produce the cable core and any subsequent processing should result in zero incremental loss, which requirement also requires the use of a soft filling material. The cable core must be able to withstand temperatures of the order of 150° C. for twenty minutes since it will experience such temperatures during polyethylene over moulding at a joint, for example. Furthermore the filling material used must not degrade either the fibre coating or the C-section material, which is currently copper, but may be another metal, for example, aluminium, or an alloy.

Figure 4:
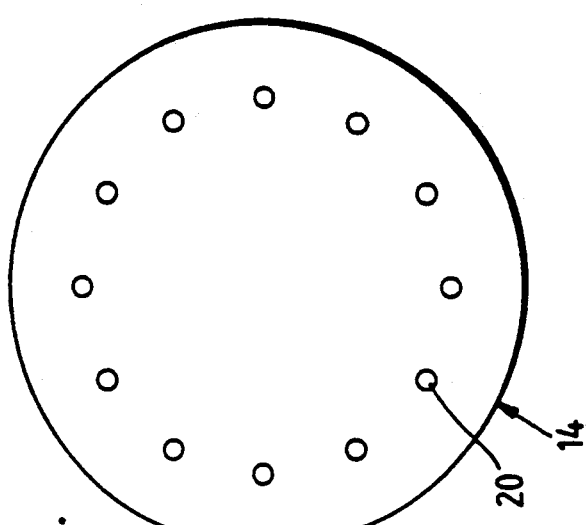
FIG. 4 illustrates an end view of a guide aperture of FIG. 2 on an enlarged scale.
Figure 3:
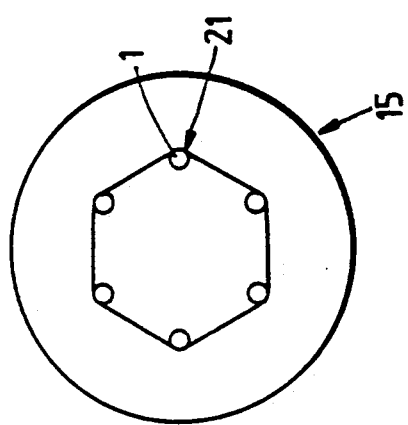
FIG. 3 illustrates an end view of a guide plate of FIG. 2 on an enlarged scale.
Figure 1:
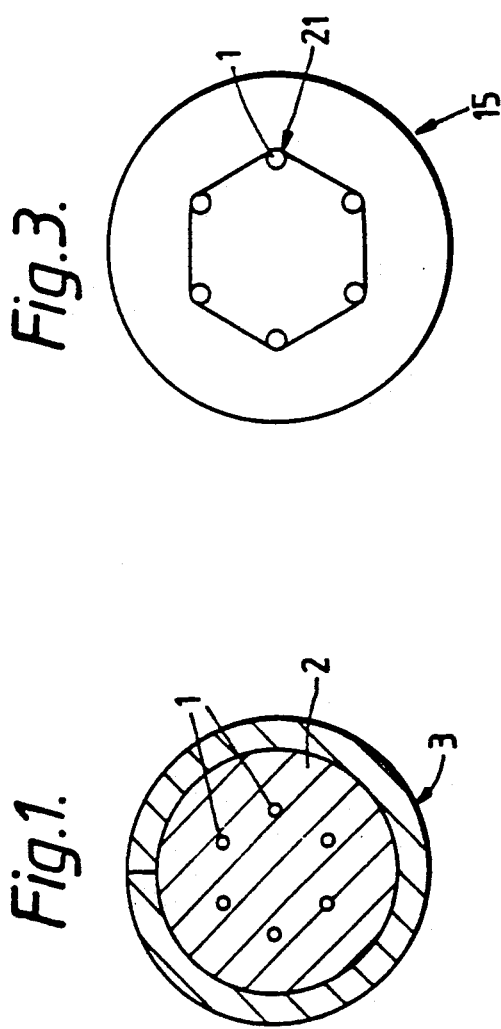
FIG. 1 illustrates cross-section through a submarine cable core manufactured according to the present invention.

The process of the present invention is a one-shot process which basically comprises insertion of fibres and liquid filling material directly into a C-section, closing C-section and changing (curing) the filling material to a state in which it is a resilient solid. The result is a submarine cable core package which is shown in cross-section in FIG. 1 and comprises a plurality of primary coated fibres 1 which are held in predetermined positions relative to one another by cured filling material 2 that was inserted into a C-section in a liquid state together with the fibres 1, the C-section having been closed subsequently to provide a pressure tube 3. Since the curing process takes place within a closed metallic C-section, a number of cross-linking mechanisms are ruled out, particularly the use of ultra-violet or other types of irradiation. The reaction rate is required to be rapid since the fibres are required to remain in registered positions and therefore cure must be complete before the package is wound onto a storage drum. The cure time thus should be of the order of a few seconds.

Rapid cure times are achievable with two-part systems which cure after mixing, even at room temperature, although heat may accelerate the process.

A presently preferred filling material comprises a two-part polyurethane whose parts are initially liquid but which when mixed react rapidly to produce a solid polymer, the reaction being exothermic. Such a filling material is referred to as a two part exothermal curing polyurethane.

It might be considered that materials such as two-part room temperature vulcanising silicones with long pot lives at room temperature could be employed. However, we have found them to be impractical. Even with the installation of an in-line curing oven operating at 400° C., insufficient curing was completed with even very modest line speeds. Difficulties associated with curing, coupled with the high price of such materials, makes them particularly unattractive. Other materials considered but not proceeded With, due to insufficient mechanical performance, included thixotropic and hot melt materials. A possible alternative to polyurethanes are polysulphide rubbers, but they offer no apparent advantages over polyurethanes and are currently less well developed.

Figure 2:
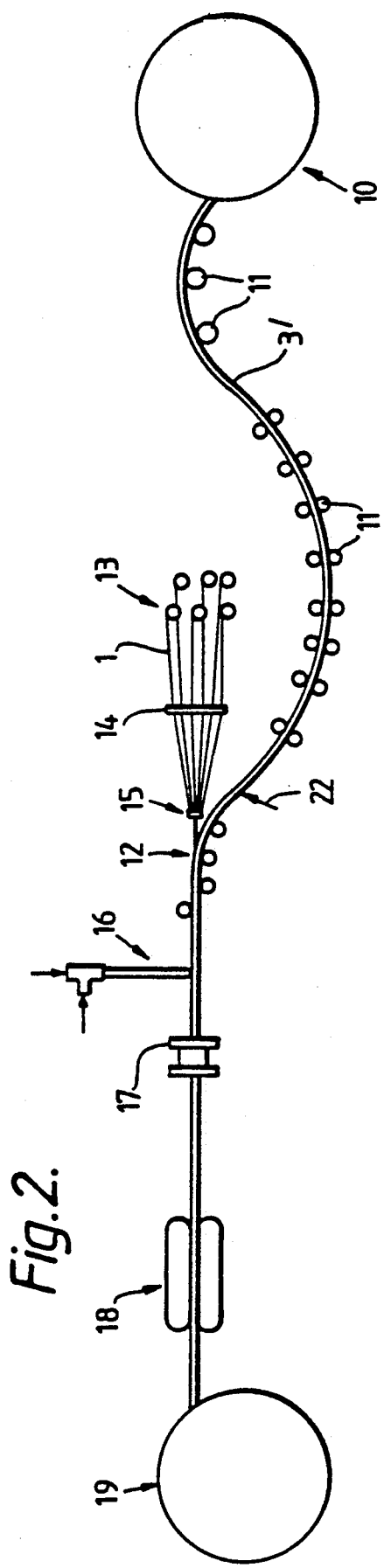
FIG. 2 shows a schematic layout of equipment employed to perform the method of the present invention.

The closing-line equipment illustrated in FIG. 2 comprises a C-section pay-off 10, guide means 11 which serve to ensure that the C-section 3' approaches the fibre insertion point 12 from below with the open slot (slit) uppermost, optical fibre pay-offs 13, an optical fibre guide plate 14, a guide aperture 15, a filling material dispenser, such as a static mixer 16, from which the mixed two-part exothermal curing polyurethane is dispensed into the C-section $3^1$ via the slit, a C-section closing die 17, a hauler 18 and a take-up drum 19. As an alternative to prepared C-section $3^1$, flat strip may be employed and suitable means for forming it into a C-section included in the closing line. The material dispenser may alternatively involve a dynamic mixer.

Each of the fibres 1 from the pay-offs 13 passes through a respective ceramic eye 20 in the guide plate 14. In the embodiment of the cable core being manufactured with the line of FIG. 2, there are six optical fibres 1, although other numbers are possible, thus not all of the eyes 20 of the guide plate are employed. Each fibre 1 is associated with a respective "corner" 21 of the hexagonal guide aperture 15 in this example, for other numbers of fibres different aperture shapes would be employed. The fibres 1 are held in the corners 21 by back tension. The guide aperture is mounted such as to be adjustable in the x,y and z directions, that is in the basic direction of feed through the equipment and in two directions at right angles in a plane transverse to the basic direction.

The static mixer 16 has two inputs, one for each component part of the two-part polyurethane and, for example, comprises a polymer tube 6–10 mm internal diameter and 100–200 mm long in which is contained a polymer helix, the diameter of which matches the internal diameter of the tube. The components are fed to the mixer inputs by pumping means (not shown). The helix may have between 15 and 40 turns, depending on the type of materials to be mixed. Mixing is achieved by splitting the flow of the two component parts every turn of the helix, which is not continuous and is rotated through an angle of 90° every complete turn. Flow rates for polyurethanes are typically 100–300 ml per min and a 20 turn, 6 mm internal diameter static mixer has proved suitable for filling a C-section. Cure after mixing of the components is rapid, of the order of one minute at room temperature, but using a static mixer as described above no problems of curing within the mixer occurred during trials. After cure the polyurethanes employed typically have a Shore hardness $\leq 400$.

To produce a submarine cable core package the C-section 3' is fed, slit uppermost, through the guide means 11. The fibres are fed into the C-section and prior to the C-section being closed the mixed filling material is inserted into the C-section at a sufficient flow rate to ensure adequate fill. The C-section is heated to about 60° C. (max) at a position before the insertion point 12, this being indicated by arrow 22, and this accelerates the curing process. The C-section is closed by die 17 in a conventional manner. Curing takes place before the hauler 18 is reached. The guide aperture position is adjusted to obtain the required relative spacing of the fibres within the closed C-section. The C-section is not fully closed and excess polyurethane can fill the remaining slit. The cured polyurethane is found to be bonded to the interior of the closed C-section, thereby overcoming the problem of relative movement, but is easily removable from the fibres themselves, by mechanical means. For stop/restart of the line the heating source is switched off and the filling material dispenser moved to prevent flow into the C-section.

Whereas the pressure tube is described in the above as formed from a C-section 3', that is a single element, it may alternatively be formed from two or more elements which when close together define a tube, and which can be separated to allow insertion of the fibres and injection of the filling material.

WE CLAIM:

1. A method of manufacturing a core for an optical fibre submarine cable comprising the steps of feeding a plurality of optical fibres in a spaced apart relationship into a space delimited by one or more elongate elements from which a tubular structure can be formed, injecting a liquid filling material into the space, forming said tubular structure and permitting or causing the liquid filling material to be converted to a solid material in which the fibres are embedded at respective positions spaced apart from one another and the tubular structure.

2. A method as claimed in claim 1 wherein the liquid filling material is a two-part exothermic curing polyurethane, and including the step of mixing the two parts thereof in a static mixer prior to said injecting step.

3. A method of manufacturing an optical fibre package comprising the steps of:
moving a C-sectioned elongate member in a first general direction past a first point;
feeding at least one optical fibre into the interior of the elongate member at the first point;
injecting a liquid filling material into the interior of the elOngate member to surround the or each fibre;
causing the cross-section of the elongate member to become substantially circular, and
permitting or causing the liquid filling material to be converted to a solid material in which the or each fibre is embedded in a respective predetermined position spaced apart from one another and the elongate member.

4. A method as claimed in claim 3 wherein the liquid filling material is a two-part exothermic curing polyurethane, and including the step of mixing the two parts thereof in a static mixer prior to said injecting step.

5. A method as claimed in claim 4 further including the step of heating the elongate member before it passes the first point whereby to accelerate curing of the filling material.

6. A method as claimed in claim 3 wherein the elongate member is of an electrically conductive material and comprises a pressure resistant tube when of substantially circular cross-section, and wherein the elongate member is passed through a closing die to cause its cross-section to become substantial circular.

7. A method as claimed in claim 3 wherein there are a plurality of fibres and the fibres are fed through guide means prior to feeding into the elongate member, which guide means serve to position the fibres at relative positions such that when the fibres are embedded they are disposed at said respective predetermined positions.

8. A method as claimed in claim 3, further including the step of forming the C-sectioned elongate member from flat strip.

9. A method of manufacturing a core for an optical fibre submarine cable comprising the steps of feeding a plurality of optical fibres in a spaced apart relationship into an open C-section, injecting a liquid two-part exothermic curing polyurethane filling material into the C-section, closing the C-section and permitting or causing curing of said filling material as a result of which the fibres become embedded in cured filling material at respective positions spaced apart from one another and the closed section.

10. A method of manufacturing a core for an optical fibre submarine cable comprising the steps of feeding a plurality of optical fibres in a spaced apart relationship into a space delimited by one or more elongate elements from which a tubular structure can be formed, injecting a liquid two-part exothermic curing polyurethane filling material into the space, forming said tubular structure and permitting or causing curing of said filling material as a result of which the fibres become embedded in cured filling material at respective positions spaced apart from one another and the tubular structure.

* * * * *